US010394739B2

(12) United States Patent
Wakita

(10) Patent No.: US 10,394,739 B2
(45) Date of Patent: Aug. 27, 2019

(54) COMMUNICATION SYSTEM FOR IN-VEHICLE DIAGNOSTIC DATA

(71) Applicant: HONDA MOTOR CO., LTD., Tokyo (JP)

(72) Inventor: Kazuyoshi Wakita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 15/457,678

(22) Filed: Mar. 13, 2017

(65) Prior Publication Data

US 2017/0270068 A1 Sep. 21, 2017

(30) Foreign Application Priority Data

Mar. 15, 2016 (JP) ................................ 2016-051519

(51) Int. Cl.
*G06F 13/40* (2006.01)
*H04L 29/08* (2006.01)
(Continued)

(52) U.S. Cl.
CPC ...... *G06F 13/4022* (2013.01); *G06F 11/0739* (2013.01); *H04L 12/40013* (2013.01);
(Continued)

(58) Field of Classification Search
None
See application file for complete search history.

(56) References Cited

U.S. PATENT DOCUMENTS 7,203,580 B2 * 4/2007 Ban ..................... H04L 12/417
 123/396
9,224,251 B2 * 12/2015 Harata ................ H04L 12/4625
(Continued)

FOREIGN PATENT DOCUMENTS

JP 2003-256033 A 9/2003
JP 2009126299 A * 6/2009
(Continued)

OTHER PUBLICATIONS

Machine Translation of JP 2013-28238A to Bessho. (Year: 2013).*
(Continued)

*Primary Examiner* — Steven G Snyder
(74) *Attorney, Agent, or Firm* — Thomas | Horstemeyer, LLP

(57) ABSTRACT

A communication system includes a first communication apparatus connected to first and second communication paths and at least one second communication apparatus connected to the second communication path. The first communication apparatus includes first and second communication units configured to perform communication with the first and second communication paths, respectively, and a control unit configured to receive a first frame storing a diagnosis request from the first communication path, specify, among the at least one second communication apparatus, a second communication apparatus to process the diagnosis request, determine whether the first communication apparatus can process the diagnosis request instead of the specified second communication apparatus, acquire, if it is determined that the diagnosis request can be processed, a diagnosis result by processing the diagnosis request, and transmit a frame storing the diagnosis result to the first communication path.

11 Claims, 7 Drawing Sheets

(51) Int. Cl.
*H04L 12/40* (2006.01)
*G06F 11/07* (2006.01)
*H04L 12/46* (2006.01)

(52) U.S. Cl.
CPC .......... *H04L 12/4625* (2013.01); *H04L 67/12* (2013.01); *H04L 2012/40215* (2013.01)

(56) References Cited

U.S. PATENT DOCUMENTS

| | | | |
|---|---|---|---|
| 9,947,144 B2* | 4/2018 | Kim | G07C 5/008 |
| 10,099,703 B2* | 10/2018 | Tanaka | H04L 12/40091 |
| 2004/0162653 A1* | 8/2004 | Ban | H04L 12/417 |
| | | | 701/29.1 |
| 2010/0324777 A1* | 12/2010 | Tominaga | G07C 5/008 |
| | | | 701/31.4 |
| 2012/0239246 A1* | 9/2012 | Tanaka | H04L 12/40091 |
| | | | 701/33.4 |
| 2014/0277925 A1* | 9/2014 | Tanaka | H04L 12/40091 |
| | | | 701/33.4 |
| 2015/0254909 A1* | 9/2015 | Harata | H04L 12/4625 |
| | | | 701/31.5 |
| 2016/0163125 A1* | 6/2016 | Kim | G07C 5/008 |
| | | | 701/31.4 |
| 2016/0318522 A1* | 11/2016 | Tanaka | H04L 12/40091 |
| 2017/0134164 A1* | 5/2017 | Haga | B60R 16/023 |
| 2017/0187567 A1* | 6/2017 | Oda | H04L 41/0654 |
| 2018/0191471 A1* | 7/2018 | Elhaddad | H04L 1/24 |
| 2018/0302422 A1* | 10/2018 | Kishikawa | H04L 12/28 |

FOREIGN PATENT DOCUMENTS

| | | | |
|---|---|---|---|
| JP | 2011-161957 A | | 8/2011 |
| JP | 2013028238 A | * | 2/2013 |
| JP | 5272383 B2 | * | 8/2013 |
| JP | 5712845 B2 | * | 5/2015 |
| KR | 2003060579 A | * | 7/2003 |

OTHER PUBLICATIONS

Japanese Office Action dated Dec. 22, 2017, issued in corresponding Japanese Patent Application No. 2016-051519 and partial English translation. (5 pages).

* cited by examiner

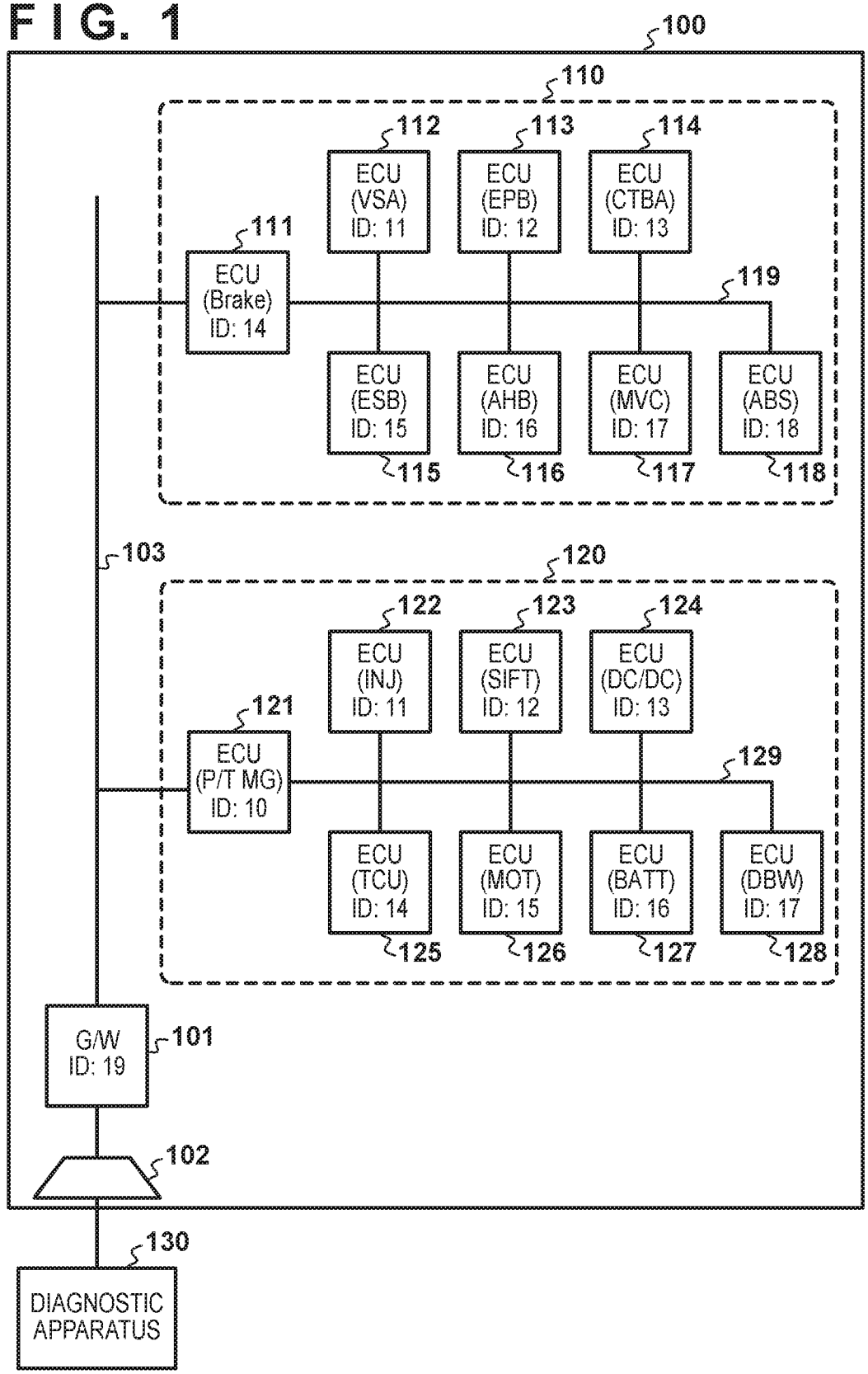

| DIAGNOSIS REQUEST | DOMAIN |
|---|---|
| DIAGNOSIS A | 14 |
| DIAGNOSIS B | 14 |
| DIAGNOSIS C | 14 |
| DIAGNOSIS D | 10 |
| ... | ... |

| DIAGNOSIS REQUEST | PROCESSING ECU |
|---|---|
| DIAGNOSIS A | VSA |
| DIAGNOSIS B | EPB |
| DIAGNOSIS C | ESB |
| ... | ... |

| ECU | ID |
|---|---|
| VSA | 11 |
| EPB | 12 |
| CTBA | 13 |
| ... | ... |

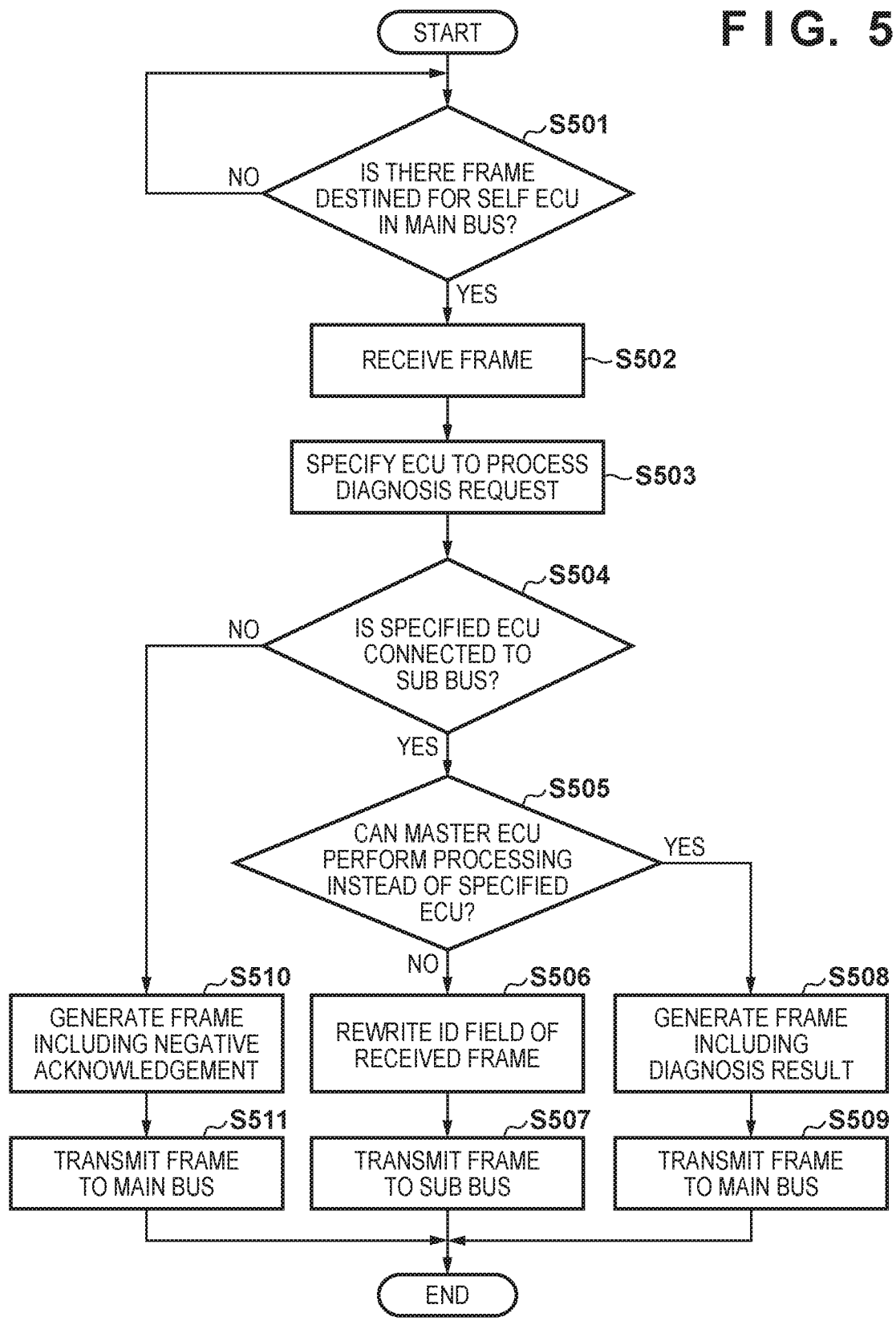

COMMUNICATION SYSTEM FOR IN-VEHICLE DIAGNOSTIC DATA

CROSS-REFERENCE TO RELATED APPLICATION

This application is based upon and claims the benefit of priority from the prior Japanese Patent Application No. 2016-051519, filed on Mar. 15, 2016, the entire contents of which are incorporated herein by reference.

BACKGROUND OF THE INVENTION

Field of the Invention

The present invention relates to a communication system.

Description of the Related Art

A number of ECUs (Electronic Control Units) are provided in a recent vehicle, and communicate with each other via a vehicle network such as a CAN (Controller Area Network). The vehicle network may be called an in-vehicle network. In accordance with a CAN communication protocol, unique identification information (ID) is assigned to each ECU. To diagnose a vehicle, a diagnostic apparatus outside the vehicle communicates with each ECU using the identification information assigned to the ECU. Japanese Patent Laid-Open No. 2011-161957 describes an arrangement in which a central control unit manages a plurality of ECUs.

SUMMARY OF THE INVENTION

A communication system mounted on a vehicle needs to return a diagnosis result by an ECU to a diagnostic apparatus within a legally defined time. As the arrangement of the communication system is more complicated, it may become more difficult to satisfy this requirement. In not only the communication system mounted on the vehicle but also a communication system mounted on another machine, a shorter response time can be preferable. According to an aspect of the present invention, the response time of the communication system to a diagnosis request is shortened.

According to some embodiments, a communication system is provided. The system includes a first communication apparatus connected to a first communication path and a second communication path, and at least one second communication apparatus connected to the second communication path. The first communication apparatus includes a first communication unit configured to perform communication with the first communication path, a second communication unit configured to perform communication with the second communication path, and a control unit configured to receive a first frame storing a diagnosis request from the first communication path, specify, among the at least one second communication apparatus, a second communication apparatus to process the diagnosis request, determine whether the first communication apparatus can process the diagnosis request instead of the specified second communication apparatus, acquire, if it is determined that the diagnosis request can be processed, a diagnosis result by processing the diagnosis request, and transmit a second frame storing the diagnosis result to the first communication path.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of a communication system according to some embodiments of the present invention;

FIGS. 3A to 3C are tables respectively showing examples of tables used in the communication system shown in FIG. 1;

FIG. 5 is a flowchart for explaining the operation of the communication system shown in FIG. 1;

DESCRIPTION OF THE EMBODIMENTS

Communication System

Figure 2A:
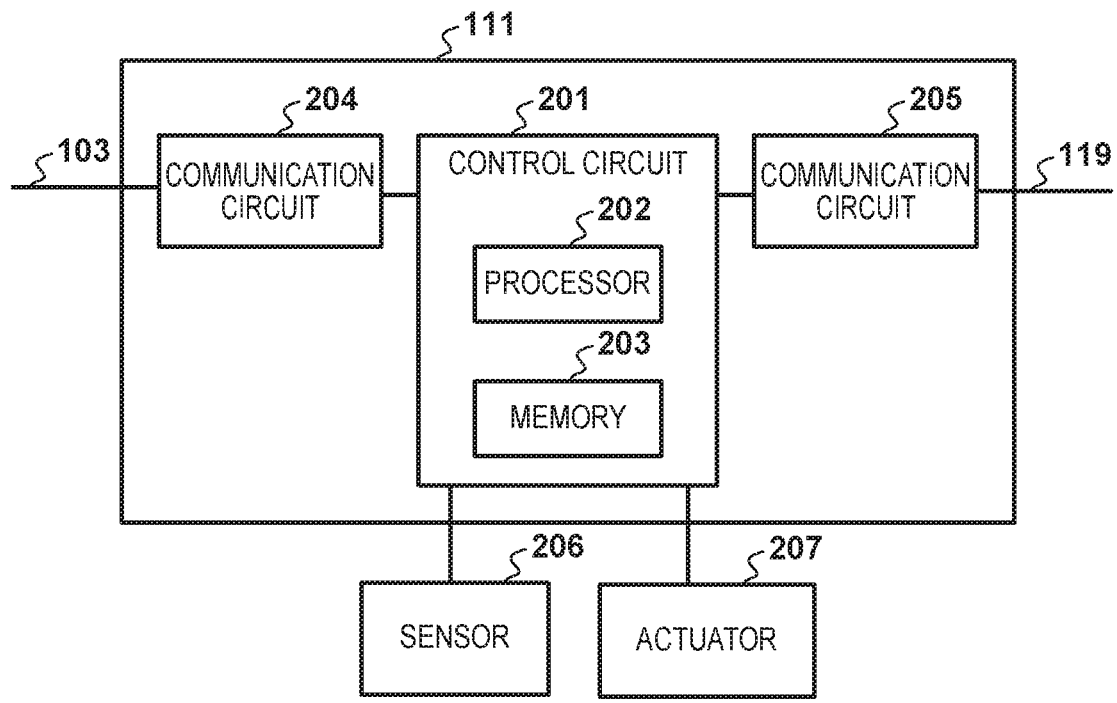
FIGS. 2A and 2B are block diagrams respectively showing the arrangements of ECUs shown in FIG. 1.

A communication system 100 according some embodiments will be described with reference to FIG. 1. As an example, the communication system 100 is mounted on a vehicle such as a car, and forms an in-vehicle network. Instead, the communication system 100 may be mounted on a transport equipment, a machine tool, an industrial robot, or the like. The communication system 100 includes, as communication apparatuses, a plurality of ECUs (Electronic Control Units) 111 to 118 and 121 to 128, and a gateway apparatus (G/W) 101. In the communication system 100, the plurality of ECUs are divided into a plurality of domains and arranged. In FIG. 1, a function controlled by each ECU is put in parentheses. For example, the ECU 111 controls a brake function.

In the example of FIG. 1, the communication system 100 includes a brake system domain 110 and a power train (P/T) system domain 120. The brake system domain 110 is formed by one or more ECUs 111 to 118 related to the brake function. These ECUs 111 to 118 are connected to one communication path. The communication path forming the brake system domain 110 will be referred to as a sub bus 119 hereinafter. The power train system domain 120 is formed by one or more ECUs 121 to 128 related to a power train function. These ECUs 121 to 128 are connected to one communication path. The communication path forming the power train system domain 120 will be referred to as a sub bus 129 hereinafter.

One ECU in each domain is also connected to a communication path different from the sub bus 119 or 129. This communication path will be referred to as a main bus 103 hereinafter. In the example of FIG. 1, the ECUs 111 and 121 are connected to the main bus 103. In the following description, ECUs (the ECUs 111 and 121) connected to the main bus 103 may be referred to as master ECUs. ECUs (the ECUs 112 to 118 and 122 to 128) which are not connected to the main bus 103 and are connected to only the sub bus 119 or 129 may be referred to as slave ECUs. One domain may include one or more slave ECUs or may be formed by only a master ECU without including any slave ECUs. The gateway apparatus 101 is also connected to the main bus 103. Communication via the sub bus 119 or 129 and the main bus 103 may comply with a CAN (Controller Area Network) communication protocol or another protocol.

Identification information (ID) is assigned to each of the communication apparatuses (the ECUs 111 to 118 and 121 to 128 and gateway apparatus 101) of the communication system 100. Different IDs are respectively assigned to communication apparatuses (the master ECUs 111 and 121 and gateway apparatus 101) connected to the main bus 103. Furthermore, in each domain, different IDs are respectively assigned to communication apparatuses (the master ECU and slave ECUs) connected to one sub bus. Identical IDs may be assigned to a plurality of ECUs belonging to different domains. For example, "11" is assigned, as an ID, to the ECU 112 belonging to the brake system domain 110 and the ECU 122 belonging to the power train system domain 120. As will be described in detail below, communication is performed using the ID assigned to each ECU. By allowing identical IDs of slave ECUs, the number of IDs used in the communication system 100 can be reduced.

The gateway apparatus 101 is also connected to a terminal 102 for accepting connection from the outside of the communication system 100. A diagnostic apparatus 130 existing outside the communication system 100 can connect to the terminal 102. When performing, for example, legal inspection and maintenance, the diagnostic apparatus 130 communicates with the communication system 100 via the terminal 102, and diagnoses the vehicle. The diagnostic apparatus 130 has a correspondence table between a "diagnosis request" and a "domain" as represented by a table 301 shown in FIG. 3A. The column of the "diagnosis request" of the table 301 indicates contents of a diagnosis request for the vehicle. Examples of the diagnosis request are a request of inquiring about the type and contents of a message used at the time of occurrence of a failure in the brake system, and a request of inquiring about the operation result of an ABS (Antilock Braking System) function for a test input. The diagnosis request is provided by targeting one of the domains of the vehicle. The column of the "domain" of the table 301 indicates the ID of a domain as the target of each diagnosis request. The ID of the domain coincides with an ID assigned to the master ECU of each domain. If, for example, "diagnosis A" is a diagnosis request related to the brake system domain 110, the "domain" indicates "14" as the ID of the master ECU 111. If "diagnosis D" is a diagnosis request related to the power train system domain 120, the "domain" indicates "10" as the ID of the master ECU 121. The diagnostic apparatus 130 selects a diagnosis request from the table 301, and transmits it to the communication system 100.

Communication Apparatus

Figure 2B:
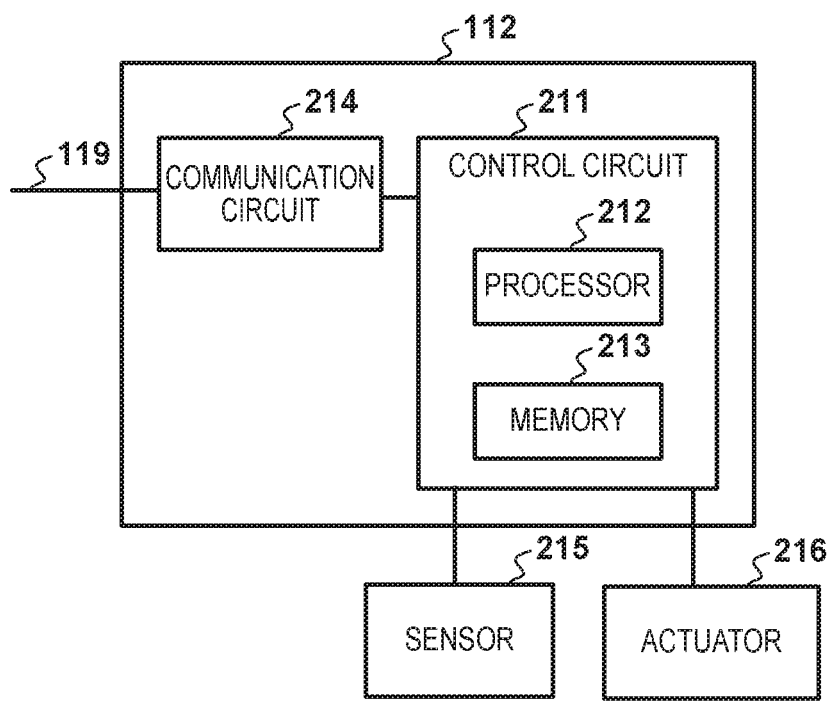

Examples of the arrangements of the communication apparatuses included in the communication system 100 will be described with reference to FIGS. 2A and 2B. The ECU 111 will be representatively described as an example of the master ECU with reference to FIG. 2A, and the ECU 112 will be representatively described as an example of the slave ECU with reference to FIG. 2B.

The master ECU 111 includes a control circuit 201 and communication circuits 204 and 205. The control circuit 201 controls the overall operation of the master ECU 111. The control circuit 201 includes a processor 202 such as a microprocessor formed by a CPU and the like, and a memory 203 formed by a ROM, a RAM, and the like. An operation by the ECU 111 is controlled when the processor 202 executes a program stored in the memory 203. Instead, the control circuit 201 may be formed by a dedicated circuit such as an ASIC (Application Specific Integrated Circuit), or a combination of a dedicated circuit and a processor.

As shown in FIG. 1, the master ECU 111 is an ECU taking charge of the brake function. Therefore, the control circuit 201 collects information about a brake using a sensor 206, and controls the actuation of the brake using an actuator 207 in accordance with the information. In addition to the operation as the ECU, the master ECU 111 performs operations to be described with reference to flowcharts (to be described later).

The communication circuit 204 processes communication with the main bus 103. More specifically, the communication circuit 204 performs a reception operation of receiving data which flows through the main bus 103 and is destined for the master ECU 111, and transferring the data to the control circuit 201, and a transmission operation of transmitting the data received from the control circuit 201 to the main bus 103. The communication circuit 205 processes communication with the sub bus 119. More specifically, the communication circuit 205 performs a reception operation of receiving data which flows through the sub bus 119 and is destined for the master ECU 111, and transferring the data to the control circuit 201, and a transmission operation of transmitting the data received from the control circuit 201 to the sub bus 119. The communication circuits 204 and 205 may be formed as different circuits or formed as an integrated circuit.

The memory 203 also stores tables 302 and 303 shown in FIGS. 3B and 3C. The table 302 is a correspondence table between a "diagnosis request" and a "processing ECU". The column of the "diagnosis request" of the table 302 indicates contents of a diagnosis request for the vehicle. The column of the "diagnosis request" of the table 302 corresponds to the column of the "diagnosis request" of the table 301. The column of the "processing ECU" of the table 302 indicates a function controlled by an ECU which is to process each diagnosis request. For example, the first entry of the table 302 indicates that "diagnosis A" is to be processed by the ECU 112 for controlling VSA (Vehicle Stability Assist). The table 302 may be commonly used for a plurality of vehicle types and grades. Thus, some vehicle types and grades include no ECU indicated in the column of the "processing ECU" of the table 302.

The table 303 is a correspondence table between an "ECU" and an "ID". The column of the "ECU" of the table 303 indicates a function controlled by a slave ECU belonging to the same brake system domain 110 as that of the master ECU 111. The column of the "ID" of the table 303 indicates an ID assigned to each ECU. The table 303 may be different for each domain of the same vehicle type and grade, and may be different for each vehicle type and grade of the same domain.

The memory 203 also stores an application program for causing the master ECU 111 to perform processes instead of the slave ECUs 112 to 118 belonging to the same brake system domain 110. This application program is executed by, for example, the processor 202. It may be possible to respond to some diagnosis requests from the diagnostic apparatus 130 without using a sensor 215 and an actuator 216 both of which are connected to the ECU 112. If, for example, the diagnosis request is a request of inquiring about the type and contents of a message used at the time of occurrence of a failure of the slave ECU, this information is stored in advance in the master ECU 111, thereby allowing the master ECU 111 to respond to the diagnosis request without transferring the diagnosis request to the slave ECU. This information may be stored in the memory 203 by the manufacturer of the communication system 100, or may be acquired in advance from the slave ECU and stored in the memory 203 by the control circuit 201 of the master ECU 111.

The slave ECU 112 includes a control circuit 211 and a communication circuit 214. The control circuit 211 controls the overall operation of the slave ECU 112. The control circuit 211 includes a processor 212 such as a microprocessor formed by a CPU and the like, and a memory 213 formed by a ROM, a RAM, and the like. An operation by the ECU 112 is controlled when the processor 212 executes a program stored in the memory 213. Instead, the control circuit 211 may be formed by a dedicated circuit such as an ASIC (Application Specific Integrated Circuit), or a combination of a dedicated circuit and a processor.

As shown in FIG. 1, the slave ECU 112 is an ECU for controlling the VSA function. Therefore, the control circuit 211 collects information about VSA using the sensor 215, and controls the actuation of VSA using the actuator 216 in accordance with the information.

The communication circuit 214 processes communication with the sub bus 119. More specifically, the communication circuit 214 performs a reception operation of receiving data which flows through the sub bus 119 and is destined for the slave ECU 112, and transferring the data to the control circuit 211, and a transmission operation of transmitting the data received from the control circuit 211 to the sub bus 119.

Frame

Figure 4A:
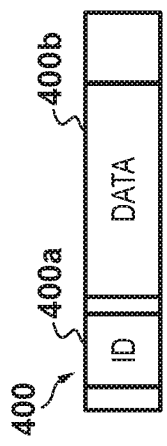
FIGS. 4A and 4B are views showing examples of frames communicated in the communication system shown in FIG. 1.

The format of a frame 400 used for communication in the communication system 100 will be described with reference to FIG. 4A. The frame 400 is a data unit communicated in the communication system 100, and can also be called a data frame. The frame 400 may comply with, for example, the CAN communication protocol. The frame 400 includes an ID field 400a and a data field 400b. The ID field 400a stores an ID assigned to each of the communication apparatuses (the ECU 111 and the like and the gateway apparatus 101) of the communication system 100. As will be described below, the ID field 400a may store the ID of the communication apparatus as the transmission source of the frame 400, the ID of the communication apparatus as the destination of the frame 400, or the like. The data field 400b stores data to be communicated.

Figure 4B:
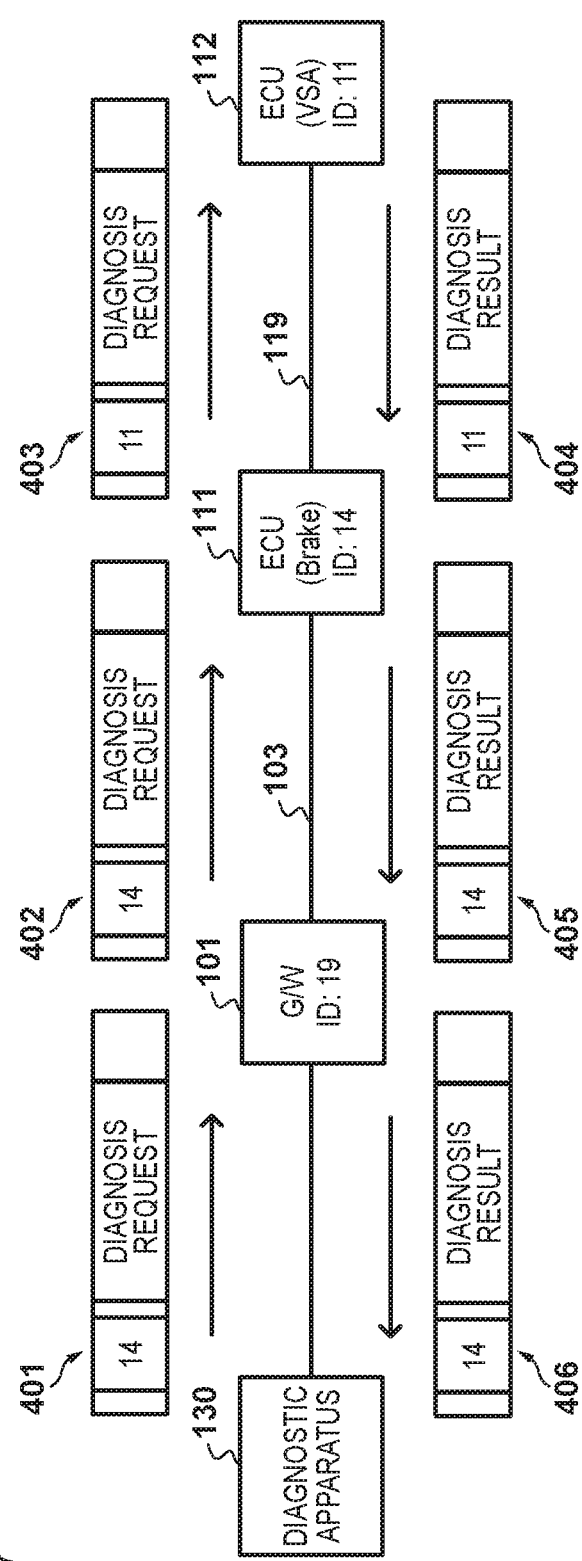

A practical example of the frame communicated between the communication apparatuses will be described with reference to FIG. 4B. A frame 401 is transmitted from the diagnostic apparatus 130 to the gateway apparatus 101. An ID field 400a of the frame 401 stores an ID assigned to the master ECU of a domain corresponding to a diagnosis request selected from the table 301. For example, when performing diagnosis about the brake system domain 110, the diagnostic apparatus 130 stores "14" as the ID of the master ECU 111 of the brake system domain 110 in an ID field 400a of a frame 402. A data field 400b of the frame 401 stores the diagnosis request selected from the table 301. For example, to confirm whether a replaced brake part is correctly operating, the diagnostic apparatus 130 stores, in the data field 400b of the frame 401, an inquiry about the operation result of the actuator for a test input. Since the diagnostic apparatus 130 and the gateway apparatus 101 are directly connected, the gateway apparatus 101 receives the frame 401 from the diagnostic apparatus 130 regardless of the value of the ID stored in the ID field 400a.

The frame 402 is transmitted from the gateway apparatus 101 to the main bus 103. The frame 402 is identical to the frame 401. That is, the gateway apparatus 101 transfers, to the main bus 103, the frame received from the diagnostic apparatus 130 without any change.

A frame 403 is a frame generated when it is determined in processing (to be described later) that the diagnosis request received by the master ECU 111 cannot be processed in the master ECU 111. The frame 403 is transmitted from the master ECU 111 to the sub bus 119. An ID field 400a of the frame 403 stores an ID assigned to a slave ECU for controlling a function to be diagnosed. For example, if the diagnosis request is related to VSA, the master ECU 111 stores "11" as the ID of the slave ECU 112 in the ID field 400a of the frame 403. A data field 400b of the frame 403 is the same as the data field 400b of the frame 402.

A frame 404 is a frame generated based on processing for the frame 403 when transmitting the frame 403 from the master ECU 111. The frame 404 is transmitted from the ECU 112 to the sub bus 119. An ID field 400a of the frame 404 stores "11" as the ID assigned to the slave ECU 112. A data field 400b of the frame 404 stores a diagnosis result by the slave ECU 112.

A frame 405 is a frame transmitted from the master ECU 111 to the main bus 103. If the master ECU 111 processes the diagnosis request instead of the slave ECU 112, it newly generates the frame 405. An ID field 400a of the frame 405 stores "14", which is the ID assigned to the master ECU 111. A data field 400b of the frame 405 stores a diagnosis result by the master ECU 111. If the master ECU 111 does not process the diagnosis request instead of the slave ECU 112, the frame 405 is identical to the frame 404. That is, the master ECU 111 transfers, to the main bus 103, the frame received from the ECU 112 without any change. If the frame 405 storing the same ID as that stored in the ID field 400a of the frame 402 flows through the main bus 103, the gateway apparatus 101 receives the frame as a frame destined for the self apparatus.

A frame 406 is transmitted from the gateway apparatus 101 to the diagnostic apparatus 130. The frame 406 is identical to the frame 405. That is, the gateway apparatus 101 transfers, to the diagnostic apparatus 130, the frame received from the master ECU 111 without any change. Since the diagnostic apparatus 130 and the gateway apparatus 101 are directly connected, the diagnostic apparatus 130 receives the frame 406 from the gateway apparatus 101 regardless of the value of the ID stored in the ID field 400a.

Communication between the diagnostic apparatus 130 and the gateway apparatus 101 may comply with a protocol different from that for communication in the main bus 103 and the sub buses 119 and 129. In this case, the diagnostic apparatus 130 transfers, to the gateway apparatus 101, pieces of information included in the ID field 400a and data field 400b of the frame 401 in accordance with another protocol, and the gateway apparatus 101 generates the frame 402 in accordance with the information. The gateway apparatus 101 extracts the pieces of information included in the ID field 400a and data field 400b of the frame 405, and transfers the pieces of information to the diagnostic apparatus 130.

Flowcharts

Figure 6:
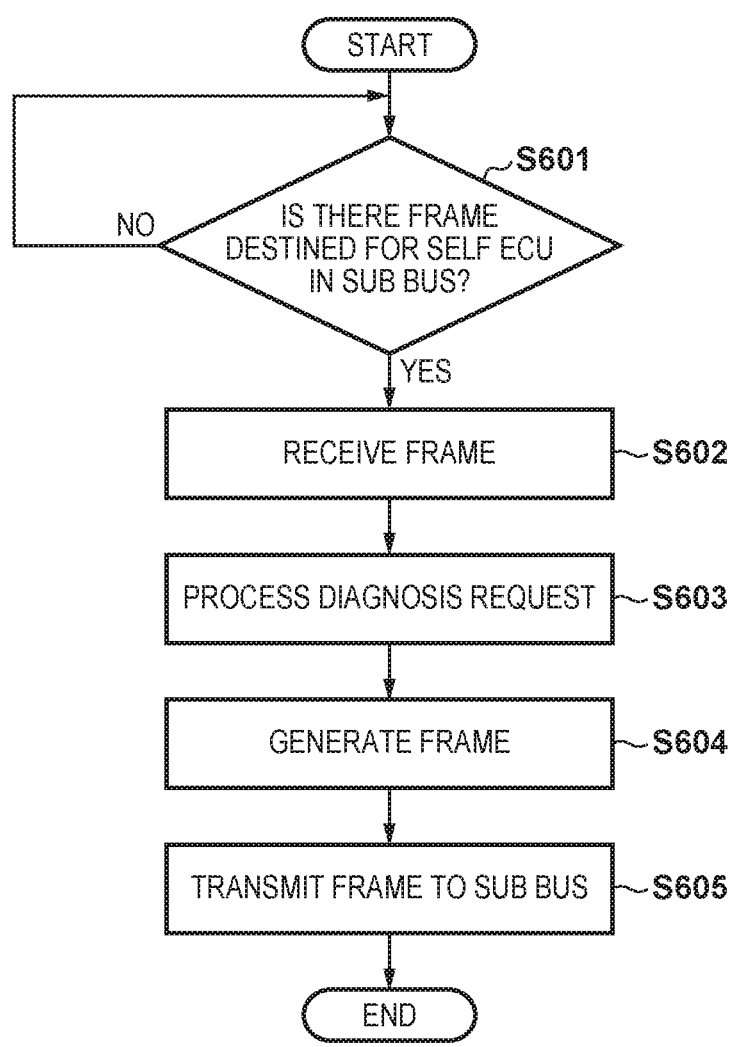
FIG. 6 is a flowchart for explaining the operation of the communication system shown in FIG. 1.
Figure 7:
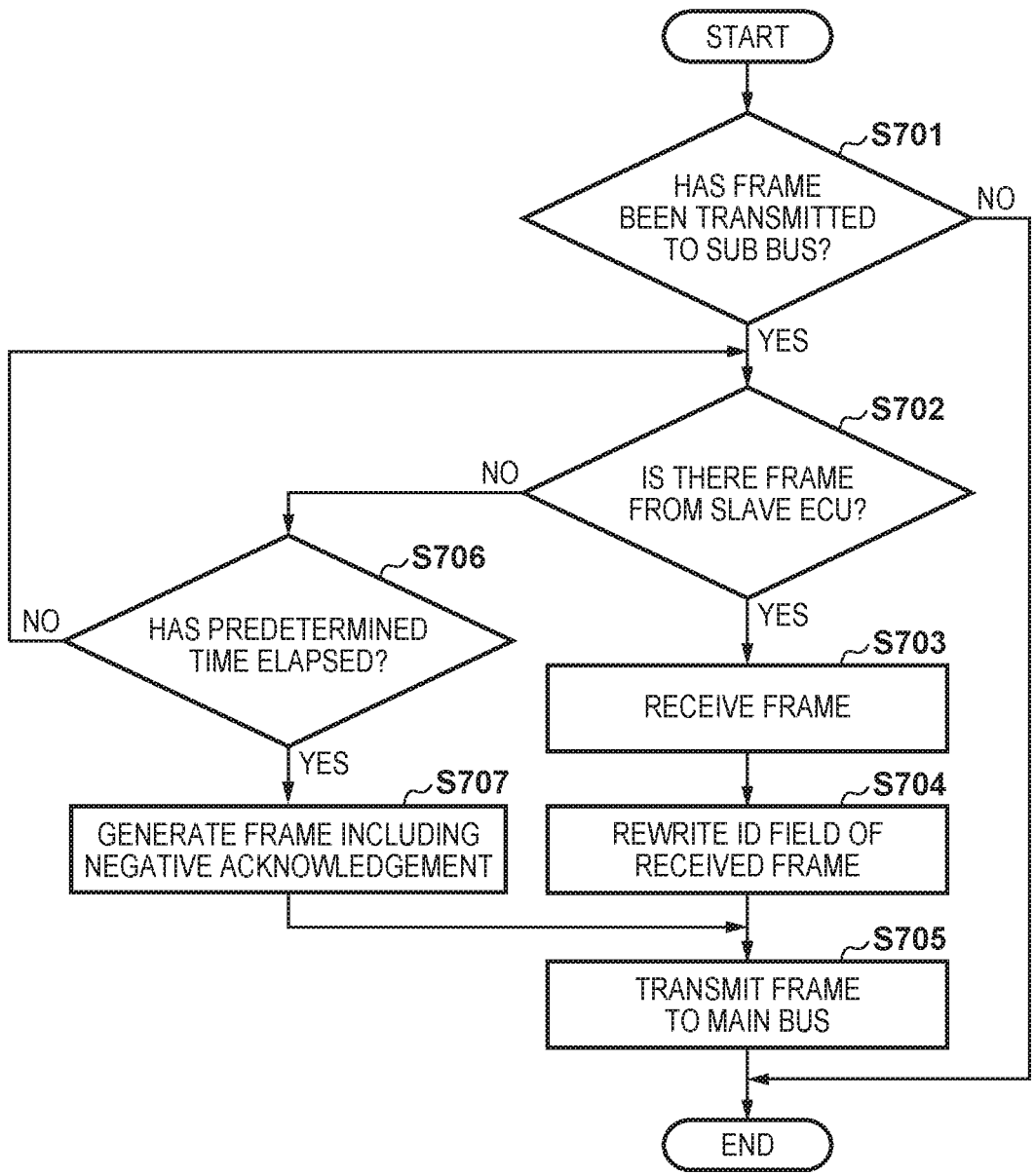
FIG. 7 is a flowchart for explaining the operation of the communication system shown in FIG. 1.

An example of the operation of the communication system 100 will be described with reference to FIGS. 5 to 7. An operation in which the master ECU (for example, the ECU 111) receives a diagnosis request will be described first with reference to FIG. 5. To receive a plurality of diagnosis requests, the master ECU 111 may repeatedly execute the operation of the flowchart of FIG. 5.

In step S501, the communication circuit 204 determines whether a frame destined for the self ECU flows through the main bus 103. If the ID field 400a of the frame flowing through the main bus 103 stores the ID ("14") of the self ECU, the communication circuit 204 determines that the frame is destined for the self ECU. If the frame 402 destined for the self ECU flows ("YES" in step S501), in step S502 the communication circuit 204 receives the frame 402 and transfers it to the control circuit 201; otherwise ("NO" in step S501), the communication circuit 204 repeats step S501.

In step S503, with reference to the table 302, the control circuit 201 specifies an ECU to process the diagnosis request stored in the data field 400b of the frame 402. In step S504, with reference to the table 303, the control circuit 201 determines whether the specified ECU is connected to the sub bus 119 (that is, whether the specified ECU belongs to the brake system domain 110).

If it is determined that the specified ECU is connected to the sub bus 119 ("YES" in step S504), the control circuit 201 determines in step S505 whether the mater ECU 111 can process the diagnosis request instead of the specified slave ECU. If it is determined that the master ECU 111 cannot process the diagnosis request ("NO" in step S505), in step S506 the control circuit 201 generates the frame 403 by rewriting the ID field 400a of the frame 402 to the ID of the specified ECU, and transfers the frame 403 to the communication circuit 205. With reference to the table 303, the control circuit 201 can acquire the ID of the specified ECU. In step S507, the communication circuit 205 transmits the received frame 403 to the sub bus 119.

If it is determined that the master ECU 111 can process the diagnosis request ("YES" in step S505), in step S508 the control circuit 201 acquires a diagnosis result by specifying, from applications held in the master ECU 111, an application necessary to process the diagnosis request instead of the specified slave ECU, and executing the specified application. The control circuit 201 creates a frame by storing the diagnosis result in the data filed 400b, and transfers the frame to the communication circuit 204. The control circuit 201 stores the ID ("14") of the self ECU in the ID field 400a of this frame. In step S509, the communication circuit 204 transmits the received frame to the main bus 103.

If it is determined that the specified ECU is not connected to the sub bus 119 ("NO" in step S504), in step S510 the control circuit 201 creates a frame by storing, in the data field 400b, a negative acknowledgement representing that no ECU necessary for diagnosis is included, and transfers the generated frame to the communication circuit 204. The control circuit 201 stores the ID ("14") of the self ECU in the ID field 400a of this frame. In step S511, the communication circuit 204 transmits the received frame to the main bus 103.

An operation in which the slave ECU (for example, the ECU 112) receives a diagnosis request based on the frame (frame 403) generated when it is determined that the diagnosis request received by the master ECU 111 cannot be processed in the master ECU 111 will be described with reference to FIG. 6. To receive a plurality of diagnosis requests, the slave ECU 112 may repeatedly execute the operation of the flowchart of FIG. 6.

In step S601, the communication circuit 214 determines whether a frame destined for the self ECU flows through the sub bus 119. If the ID field 400a of the frame flowing through the sub bus 119 stores the ID ("11") of the self ECU, the communication circuit 214 determines that this frame is destined for the self ECU. If the frame 403 destined for the self ECU flows ("YES" in step S601), in step S602 the communication circuit 214 receives the frame 403 and transfers it to the control circuit 211; otherwise ("NO" in step S601), the communication circuit 214 repeats step S601.

In step S603, the control circuit 211 executes processing in accordance with the diagnosis request stored in the data field 400b of the frame 403, and generates a diagnosis result. In step S604, the control circuit 211 generates the frame 404 by storing the ID ("11") of the self ECU in the ID field 400a, and storing the diagnosis result in the data field 400b. The ID of the self ECU is stored in the memory 213 of the control circuit 211. The control circuit 211 transfers the generated frame 404 to the communication circuit 214. In step S605, the communication circuit 214 transmits the received frame 404 to the sub bus 119.

An operation in which the master ECU (for example, the ECU 111) receives the diagnosis result which has been generated by the slave ECU by the processing based on the frame (frame 403) generated when it is determined that the diagnosis request received by the master ECU 111 cannot be processed in the master ECU 111 will be described with reference to FIG. 7. To receive a plurality of diagnosis results, the master ECU may repeatedly execute the operation of the flowchart of FIG. 7.

In step S701, the control circuit 201 determines whether the frame 403 has been transmitted to the slave ECU (for example, the ECU 112) in step S506. If it is determined that the frame 403 has not been transmitted ("NO" in step S701), the master ECU 111 need not receive the frame 404 transmitted by the slave ECU (for example, the ECU 112), and thus the control circuit 201 ends the process.

If it is determined that the frame 403 has been transmitted ("YES" in step S701), the communication circuit 205 determines in step S702 whether the frame from the slave ECU flows through the sub bus 119. If the ID field 400a of the frame flowing through the sub bus 119 stores the ID ("11") included in the table 303, the communication circuit 205 determines that this frame is destined for the self ECU. If the frame 404 destined for the self ECU flows ("YES" in step S702), in step S703 the communication circuit 205 receives the frame 404 and transfers it to the control circuit 201.

In step S704, the control circuit 201 generates the frame 405 by rewriting the ID stored in the ID field 400a of the received frame 404 to the ID ("14") of the self ECU, and transfers the frame 405 to the communication circuit 204. In step S705, the communication circuit 205 transmits the received frame 405 to the main bus 103.

If the frame 404 destined for the self ECU does not flow ("NO" in step S702), the control circuit 201 determines in step S706 whether a predetermined time has elapsed after transmitting the frame 403 in step S506. If it is determined that the predetermined time has elapsed ("YES" in step S706), the control circuit 201 determines that the frame 404 cannot be normally received from the slave ECU 112. In this case, the control circuit 201 creates a frame by storing, in the data field 400b, a negative acknowledgement representing a communication error, and transfers the frame to the communication circuit 204. The control circuit 201 stores the ID ("14") of the self ECU in the ID field 400a of this frame. After that, in step S705, the communication circuit 205 transmits the received frame 405 to the main bus 103.

If it is determined that the predetermined time has not elapsed ("NO" in step S706), the control circuit 201 returns the process to step S702, and stands by for a frame from the slave ECU. As the predetermined time, a frame response time is set in consideration of the time (for example, about 50 ms) from when the frame 401 is received until transmission of the frame 406 is completed.

In the above-described embodiment, an ECU functions as a communication apparatus connected to both the main bus 103 and the sub bus 119 or 129. Instead, a dedicated communication apparatus (that is, a communication apparatus without the sensor 206 and the actuator 207) may be connected to both the main bus 103 and the sub bus 119 or 129, and may perform the operations of the flowcharts of FIGS. 5 and 7.

Summary of Embodiment

[Arrangement 1]

There is provided a communication system (for example, 100) comprising:

a first communication apparatus (for example, 111, 121) connected to a first communication path (for example, 103) and a second communication path (for example, 119, 129); and at least one second communication apparatus (for example, 112-118, 122-128) connected to the second communication path, wherein the first communication apparatus includes a first communication unit (for example, 204) configured to perform communication with the first communication path, a second communication unit (for example, 205) configured to perform communication with the second communication path, and a control unit (for example, 201) configured to:

receive a first frame (for example, 402) storing a diagnosis request from the first communication path;

specify, among the at least one second communication apparatus, a second communication apparatus to process the diagnosis request;

determine whether the first communication apparatus can process the diagnosis request instead of the specified second communication apparatus;

acquire, if it is determined that the diagnosis request can be processed, a diagnosis result by processing the diagnosis request; and transmit a second frame (for example, 405) storing the diagnosis result to the first communication path.

According to arrangement 1, it is possible to shorten the response time of the communication system to the diagnosis request.

[Arrangement 2]

There is provided the system according to arrangement 1, wherein the first communication apparatus holds at least one of applications held in the at least one second communication apparatuses, and the control unit is further configured to acquire the diagnosis result by executing the application in the first communication apparatus.

According to arrangement 2, it is possible to obtain the above-described effect in the communication system for acquiring the diagnosis result by the application.

[Arrangement 3]

There is provided the system according to arrangement 1, wherein if it is determined that the diagnosis request cannot be processed, the control unit is further configured to transmit a third frame (for example, 403) storing the diagnosis request to the second communication path.

According to arrangement 3, it is possible to cause the second communication apparatus to process the diagnosis request.

[Arrangement 4]

There is provided the system according to arrangement 1, wherein the control unit is further configured to:

receive, from the second communication path, a fourth frame (for example, 404) storing a diagnosis result for the diagnosis request; and transmit a fifth frame (for example, 405) storing the diagnosis result to the first communication path.

According to arrangement 4, it is possible to respond with the diagnosis result via the same communication path.

[Arrangement 5]

There is provided the system according to arrangement 4, wherein the control unit is further configured to transmit the fourth frame as the fifth frame to the first communication path.

According to arrangement 5, since it is not necessary to generate a new frame, the response time can be shortened.

[Arrangement 6]

There is provided the system according to arrangement 1, wherein the control unit is further configured to:

determine whether the specified second communication apparatus is connected to the second communication path; and transmit, if it is determined that the specified second communication apparatus is not connected to the second communication path, a frame storing a negative acknowledgement to the first communication path.

According to arrangement 6, it is possible to generate an appropriate response according to the second communication apparatus included in the communication system.

[Arrangement 7]

There is provided the system according to arrangement 1, wherein the control unit is further configured to receive the first frame from a diagnostic apparatus (for example, 130) existing outside the communication system.

According to arrangement 7, it is possible to receive the diagnosis request from the external diagnostic apparatus.

[Arrangement 8]

There is provided the system according to arrangement 1, wherein the at least one second communication apparatus comprises an ECU.

According to arrangement 8, it is possible to obtain the above-described effect in the communication system using the ECU.

[Arrangement 9]

There is provided the system according to arrangement 1, wherein the first communication apparatus comprises an ECU.

According to arrangement 9, it is possible to cause the first communication apparatus, which performs the above operation, to operate as an ECU.

[Arrangement 10]

There is provided the system according to arrangement 1, wherein communication via the first communication path and the second communication path complies with a CAN communication protocol.

According to arrangement 10, it is possible to obtain the above-described effect in communication complying with the CAN communication protocol.

[Arrangement 11]

There is provided the system according to arrangement 1, wherein the system forms an in-vehicle network.

According to arrangement 11, it is possible to obtain the above-described effect in the in-vehicle network.

[Arrangement 12]

There is provided the system according to arrangement 1, wherein the at least one second communication apparatus performs processing related to a power train function.

According to arrangement 12, it is possible to obtain the above-described effect in the communication system for performing the processing related to the power train function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-051519, filed Mar. 15, 2016, which is hereby incorporated by reference herein in its entirety.

What is claimed is:

1. A communication system comprising:
 a first communication apparatus connected to a first communication path and a second communication path; and
 at least one second communication apparatus connected to the second communication path,
 wherein the first communication apparatus includes;
 a first communication unit configured to perform communication with the first communication path;
 a second communication unit configured to perform communication with the second communication path; and
 a control unit configured to:
  receive a first frame storing a diagnosis request from the first communication path;
  specify, among the at least one second communication apparatus, a second communication apparatus to process the diagnosis request;
  determine whether the first communication apparatus can process the diagnosis request instead of the specified second communication apparatus;
  acquire, if it is determined that the diagnosis request can be processed, a diagnosis result by processing the diagnosis request; and
  transmit a second frame storing the diagnosis result to the first communication path,
 wherein the first communication apparatus holds at least one of applications held in the at least one second communication apparatus, and
 wherein the control unit is further configured to acquire the diagnosis result of executing the application in the first communication apparatus.

2. The system according to claim 1, wherein if it is determined that the diagnosis request cannot be processed by the first communication apparatus, the control unit is further configured to transmit a third frame storing the diagnosis request to the second communication path.

3. The system according to claim 1, wherein the control unit is further configured to:
 receive, from the second communication path, a fourth frame storing a diagnosis result for the diagnosis request; and
 transmit a fifth frame storing the diagnosis result to the first communication path.

4. The system according to claim 3, wherein the control unit is further configured to transmit the fourth frame as the fifth frame to the first communication path.

5. The system according to claim 1, wherein the control unit is further configured to:
 determine whether the specified second communication apparatus is connected to the second communication path; and
 transmit, if it is determined that the specified second communication apparatus is not connected to the second communication path, a frame storing a negative acknowledgement to the first communication path.

6. The system according to claim 1, wherein the control unit is further configured to receive the first frame from a diagnostic apparatus existing outside the communication system.

7. The system according to claim 1, wherein the at least one second communication apparatus comprises an Electronic Control Unit (ECU).

8. The system according to claim 1, wherein the first communication apparatus comprises an Electronic Control Unit (ECU).

9. The system according to claim 1, wherein communication via the first communication path and the second communication path complies with a Controller Area Network (CAN) communication protocol.

10. The system according to claim 1, wherein the system forms an in-vehicle network.

11. The system according to claim 1, wherein the at least one second communication apparatus performs processing related to a power train function.

* * * * *